United States Patent
Burbaum et al.

(10) Patent No.: US 10,100,651 B2
(45) Date of Patent: Oct. 16, 2018

(54) WEAR RESISTANCE OF A HIGH-TEMPERATURE COMPONENT IMPARTED BY A COBALT COATING

(71) Applicant: SIEMENS AKTIENGESELLSCHAFT, München (DE)

(72) Inventors: Bernd Burbaum, Falkensee (DE); Britta Laux, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 15/115,917

(22) PCT Filed: Jan. 5, 2015

(86) PCT No.: PCT/EP2015/050032
§ 371 (c)(1),
(2) Date: Aug. 2, 2016

(87) PCT Pub. No.: WO2015/120994
PCT Pub. Date: Aug. 20, 2015

(65) Prior Publication Data
US 2017/0175553 A1  Jun. 22, 2017

(30) Foreign Application Priority Data
Feb. 11, 2014  (DE) .................. 10 2014 202 457

(51) Int. Cl.
*B32B 15/00*  (2006.01)
*F01D 5/28*  (2006.01)
(Continued)

(52) U.S. Cl.
CPC .............. *F01D 5/288* (2013.01); *B32B 7/02* (2013.01); *B32B 9/005* (2013.01); *B32B 9/041* (2013.01);
(Continued)

(58) Field of Classification Search
CPC .... F01D 5/288; F01D 2300/175; F01D 5/282; B32B 9/005; B32B 2603/00; B32B 9/041; F05D 2240/24
(Continued)

(56) References Cited

U.S. PATENT DOCUMENTS

| 3,713,815 A | 1/1973 | Boone et al. |
| 4,124,737 A | 11/1978 | Wolfla et al. |

(Continued)

FOREIGN PATENT DOCUMENTS

| DE | 1232756 B | 1/1967 |
| DE | 1924071 U | 7/1970 |

(Continued)

OTHER PUBLICATIONS

Nickel-Based Superalloys: Part Two, Total Materia, Feb. 2010.*
(Continued)

*Primary Examiner* — David R Sample
*Assistant Examiner* — Mary I Omori
(74) *Attorney, Agent, or Firm* — Schmeiser Olsen & Watts LLP

(57) ABSTRACT

A coated high-temperature component including a cobalt coating that has a higher carbon content is provided. A layer composed of a cobalt-based alloy is applied which is known as or is similar to substrate material, to the region of the component which is subject to the wear, wherein the component preferably comprises a nickel-based alloy as substrate material, the carbon content of which is lower than that of the cobalt-based alloy. At the high operating temperatures, carbon diffuses from the coating into the base material; this is normally undesirable, but here leads to a higher carbide proportion in the substrate and therefore to a higher hardness and therefore to an increased wear resistance.

14 Claims, 2 Drawing Sheets

(51) Int. Cl.
*B32B 7/02* (2006.01)
*B32B 9/00* (2006.01)
*B32B 9/04* (2006.01)
*B32B 15/01* (2006.01)
*B32B 15/04* (2006.01)
*B32B 15/18* (2006.01)
*B32B 15/20* (2006.01)

(52) U.S. Cl.
CPC ............ *B32B 15/01* (2013.01); *B32B 15/013* (2013.01); *B32B 15/017* (2013.01); *B32B 15/043* (2013.01); *B32B 15/18* (2013.01); *B32B 15/20* (2013.01); *F01D 5/282* (2013.01); *B32B 2307/552* (2013.01); *B32B 2603/00* (2013.01); *F05D 2220/30* (2013.01); *F05D 2240/24* (2013.01); *F05D 2300/175* (2013.01)

(58) Field of Classification Search
USPC .......................................................... 428/680
See application file for complete search history.

(56) References Cited

U.S. PATENT DOCUMENTS

| | | | |
|---|---|---|---|
| 4,275,124 A | 6/1981 | McComas et al. | |
| 4,447,503 A * | 5/1984 | Dardi | C22C 19/00 428/632 |
| 4,743,514 A * | 5/1988 | Strangman | B32B 15/01 420/443 |
| 5,192,625 A * | 3/1993 | Fishman | B23K 35/3046 148/442 |
| 2002/0005233 A1 | 1/2002 | Schirra et al. | |
| 2004/0011439 A1* | 1/2004 | Corrigan | C22C 19/056 148/555 |
| 2011/0103968 A1 | 5/2011 | Hoebel | |
| 2015/0308276 A1* | 10/2015 | Kleinow | F01D 5/20 416/228 |

FOREIGN PATENT DOCUMENTS

| | | | |
|---|---|---|---|
| DE | 2758618 C3 | 4/1980 | |
| DE | 3036206 A1 | 4/1981 | |
| DE | 2734529 C2 | 2/1986 | |
| DE | 3631475 A1 | 3/1987 | |
| DE | 3500692 C2 | 1/1989 | |
| DE | 102009010109 A1 | 9/2010 | |
| DE | 102013108111 A1 | 2/2014 | |
| EP | 1715140 A1 | 10/2006 | |
| EP | 2316988 A1 | 5/2011 | |
| EP | 1701004 B1 | 4/2014 | |
| RU | 2149202 C1 | 5/2000 | |
| RU | 2235798 C2 | 9/2004 | |

OTHER PUBLICATIONS

R. Couturier, High Temperature Alloys for the HTGR Gas Turbine: Required Properties and Development Needs, 2003.*
F. Brossa, Structure and composition of MCrAlY coatings modified by Al additions, Jan. 1, 1993, Journal de Physique IV Colloque.*
Caron P. et al; "Evolution of Ni-based superalloys for single crystal gas turbine blade applications"; Aerospace Science and Technology; vol. 3; No. 8; pp. 513-523 ISSN: 1270-9638; DOI: 10.1016/SI270-9638(99)00108-X; XP055174145; 1999.
"Special Metals Inconel alloy 718"; www.specialmetals.com, URL:http://www.specialmetals.com/documents/Inconel alloy 718. pdf; pp. 1-28; XP055174172; 2007.
Sidhu T.S. et al; "Studies of the metallurgical and mechanical properties of high velocity oxy-fuel sprayed stellite-6 coatings on Ni- and Fe-based superalloys"; Surface and Coatings Technology, Elsevier, Amsterdam, vol. 201; No. 1-2; pp. 273-281; ISSN: 0257-8972; DOI: 10.1016/J.SURFCOAT.2005.11.108; XP024996471; 2006.
International Search Report—PCT/EP2015/050032—International Filing Date: Jan. 5, 2015; ; 3 pgs.
Korean Office Action dated Aug. 21, 2017; Patent Application No. 10-2016-7021618.

* cited by examiner

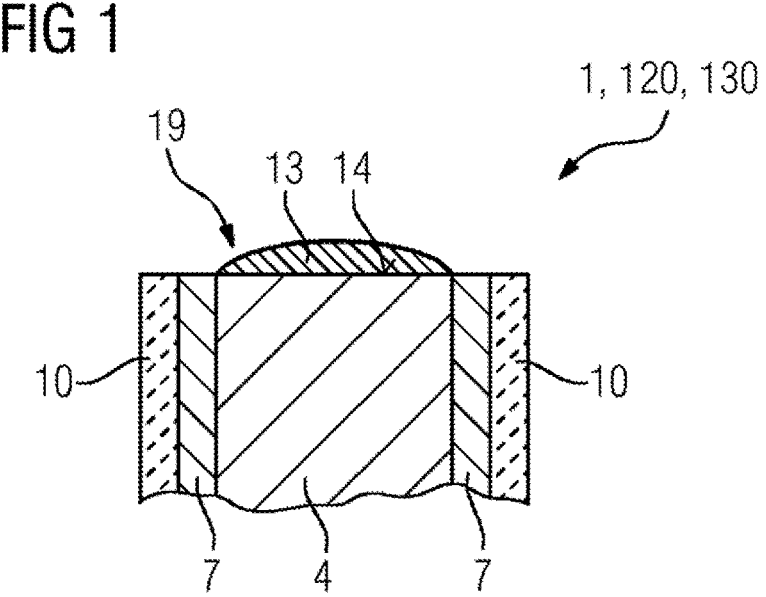
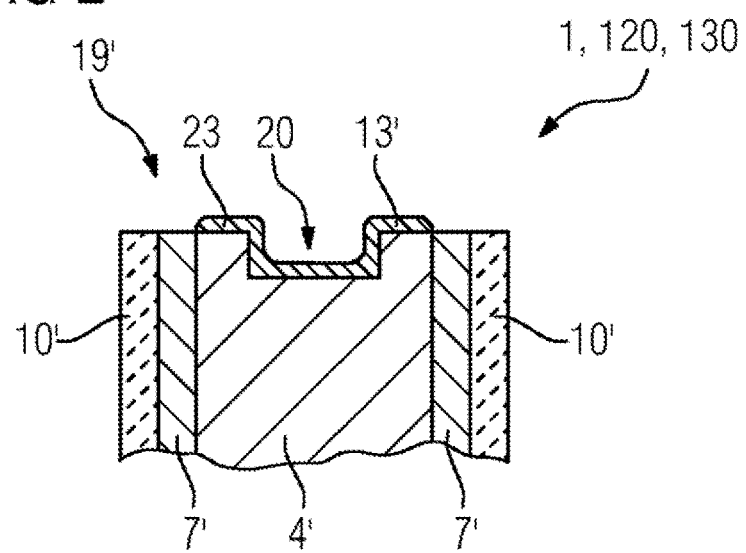

FIG 3

| Material | C | Cr | Ni | Co | Mo | W | Ta | Nb | Al | Ti | B | Zr | Hf |
|---|---|---|---|---|---|---|---|---|---|---|---|---|---|
| Ni-based precision casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based precision casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

Chemical composition in %

WEAR RESISTANCE OF A HIGH-TEMPERATURE COMPONENT IMPARTED BY A COBALT COATING

CROSS-REFERENCE TO RELATED APPLICATIONS

This application claims priority to PCT Application No. PCT/EP2015/050032, having a filing date of Jan. 5, 2015, based off of DE Application No. 102014202457.9 having a filing date of Feb. 11, 2014, the entire contents of which are hereby incorporated by reference.

FIELD OF TECHNOLOGY

The following relates to a high-temperature component in which use is made of a layer composed of a cobalt-based alloy in order to increase the wear resistance.

BACKGROUND

In the high-temperature range, blade or vane tips of turbine blades or vanes in particular exhibit increased wear caused by erosive material removal.

This has the effect that the tips of the rotor blades regularly have to be reshaped by various repair methods such as welding or soldering.

SUMMARY

An aspect relates to a method by means of which the wear resistance is improved in order that the maintenance intervals can be increased.

An aspect relates to a component, the component comprising: a metallic substrate, wherein the metallic substrate is a nickel-based superalloy or a cobalt-based superalloy, and wherein the metallic substrate has a first carbon content and a layer composed of a cobalt-based alloy, wherein the layer is applied directly to a region of the substrate having increased wear and wherein the layer has a thickness of 1 μm to 100 μm, wherein the cobalt-based alloy of the layer comprises at least chromium, nickel, and tungsten, and at least one substance selected from the group consisting of: tantalum, aluminum, and titanium, wherein the cobalt-based alloy fails to include rhenium and fails to include yttrium, wherein the layer has a second carbon content that is greater than the first carbon content of the substrate, and wherein the metallic substrate is coated with a metallic coating and/or a ceramic coating on the metallic coating, which adjoin the region of the substrate having the increased wear, and wherein the metallic coating comprises no carbon and wherein the metallic coating comprises NiCoCrAl, NiCoCrAlY, NiCoCrAlTa, NiCoCrAlFe, NiCoCrAlYFe, NiCoCrAlYFeTa, NiCoCrAlFeTa, or NiCoCrAlYTa.

It is proposed to apply a layer composed of a cobalt-based alloy, which is known as or is similar to substrate material, to the region of the component which is subject to the wear, wherein the component preferably comprises a nickel-based alloy as substrate material, the carbon content of which is lower than that of the cobalt-based alloy. At the high operating temperatures, carbon diffuses from the coating into the base material; this is normally undesirable, but here leads to a higher carbide proportion in the substrate and therefore to a higher hardness and therefore to an increased wear resistance.

One example of a nickel-based substrate is the blade or vane material PWA1483, to which a cobalt-based alloy PWA795 is applied.

This generally leads to carbides of the MC and $M_{23}C_6$ type, which lead to the higher hardness and therefore to the increased wear resistance.

BRIEF DESCRIPTION

Some of the embodiments will be described in detail, with reference to the following figures, wherein like designations denote like members, wherein:

FIGS. 1 and 2 show exemplary embodiments of the invention; and

FIG. 3 shows a list of superalloys.

The figures and the description represent only exemplary embodiments of the invention.

DETAILED DESCRIPTION

FIG. 1 shows a substrate 4 which is coated.

Particularly in the case of high-temperature components such as turbine blades or vanes 1, 120, 130 (of FIG. 1 and FIG. 2), the substrate 4, 4' (of FIG. 1 and FIG. 2) is a nickel-based or cobalt-based superalloy; in particular, it is nickel-based (FIG. 3). The substrate 4, 4' has a first carbon proportion. A metallic protective coating 7, 7' (of FIG. 1 and FIG. 2) and/or a ceramic protective coating 10, 10' (FIG. 2) is applied to the lateral faces of the substrate 4, 4'.

The metallic protective coating 7, 7' is preferably free of carbon (C) and has in particular the composition NiCoCrAl or NiCoCrAiX (X=Y, Re), NiCoCrAlTa, NiCoCrAlFe, NiCoCrAlYFe, NiCoCrAlYFeTa, NiCoCrAlFeTa or NiCoCrAlYTa, in particular consisting thereof The proportions of tantalum (Ta) or iron (Fe) lie in the single-digit percentage range, in particular <=5% by weight.

Previously, the flat blade or vane tip 19, 19' (of FIG. 1 and FIG. 2) often had no coating, and therefore a free end 19 of the substrate 4, 4' would be exposed to the increased wear.

A layer 13, 13' (of FIG. 1 and FIG. 2) composed of a cobalt-based alloy is applied to this exposed area 14 (of FIG. 1 and FIG. 2), 20, 23 (of FIG. 2) of the substrate 4, 4'.

This cobalt-based alloy has a higher carbon content (C) than the substrate 4, 4', the absolute difference in the carbon content of the substrate 4, 4' and the layer 13, 13' being at least 0.03% by weight.

FIG. 2 shows a further exemplary embodiment, in which the tip 19' is formed as a tip which has an outer wall 23 with a recess 20. The metallic 7' and ceramic 10' coatings are similarly present here, as in FIG. 1.

Likewise, a layer 13' composed of a cobalt-based alloy is applied to the substrate 4' in the region of the tip 19' there 20, 23.

Without a further heat treatment of the components shown in FIGS. 1 and 2, after a certain period of use of the components at the relatively high temperatures, carbon (C) already diffuses from the cobalt-based layer 13, 13', preferably having a thickness of 0.1 mm, into the substrate 4, 4' after 100 hours at 1173 K-1223 K.

A ceramic layer, if appropriate in connection with the ceramic layers 10, 10', may preferably be present on the layers 13, 13'.

The nickel-based alloy of the substrate 4, 4' preferably comprises at least chromium (Cr), cobalt (Co), tungsten (W), aluminum (Al), titanium (Ti), optionally tantalum (Ta) and preferably no rhenium (Re) and preferably no yttrium (Y).

The substrate is directionally solidified in columnar form and is solidified in single-crystal form.

The cobalt-based alloy comprises at least chromium (Cr), nickel (Ni), tungsten (W), optionally tantalum (Ta), aluminum (Al), titanium (Ti) and preferably no rhenium (Re) and preferably no yttrium (Y).

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A component comprising:
   a metallic substrate,
      wherein the metallic substrate is a nickel-based superalloy or a cobalt-based superalloy, and
      wherein the metallic substrate has a first carbon content; and
   a layer composed of a cobalt-based alloy,
      wherein the layer is applied directly to a region of the metallic substrate having increased wear and wherein the layer has a thickness of 1 µm to 100 µm,
      wherein the cobalt-based alloy of the layer comprises at least chromium, nickel, and tungsten, and at least one substance selected from the group consisting of: tantalum, aluminum, and titanium,
      wherein the cobalt-based alloy fails to include rhenium and fails to include yttrium,
      wherein the layer has a second carbon content that is greater than the first carbon content of the metallic substrate, and
   wherein the metallic substrate is coated with a metallic coating and/or a ceramic coating on the metallic coating, which adjoin the region of the metallic substrate having the increased wear, and
   wherein the metallic coating comprises no carbon and wherein the metallic coating comprises NiCoCrAl, NiCoCrAlY, NiCoCrAlTa, NiCoCrAlFe, NiCoCrAlYFe, NiCoCrAlYFeTa, NiCoCrAlFeTa, or NiCoCrAlYTa, wherein the layer is at least 10% thinner than the metallic coating of the metallic substrate.

2. The component as claimed in claim 1, wherein the region of the metallic substrate represents a flat, planar tip.

3. The component as claimed in claim 1, wherein the region of the metallic substrate represents a tip with a freestanding wall.

4. The component as claimed in claim 1, wherein an absolute difference in the first carbon content of the metallic substrate and the second carbon content of the layer is at least 0.03% by weight.

5. The component as claimed in claim 1, wherein the metallic substrate is directionally solidified in columnar form and is solidified in single-crystal form.

6. The component as claimed in claim 1, wherein the layer at most partially overlaps the metallic coating of the metallic substrate.

7. The component according to claim 1, wherein after 100 hours of operation at 1173-1223 Kelvin, at least a portion of the second carbon content diffuses from the layer into the metallic substrate.

8. A component comprising:
   a substrate having a first carbon content,
      wherein the substrate is a nickel-based superalloy or a cobalt-based superalloy, and
      wherein a metallic coating is applied to lateral faces of the substrate; and
   a layer composed of a cobalt-based alloy, wherein the cobalt-based alloy fails to include rhenium and fails to include yttrium,
      wherein the layer is applied directly to a tip region of the substrate, the tip region including a first outer freestanding wall and a second outer freestanding wall surrounding a recess, further wherein the layer is applied to the entirety of the tip region including the recess, and
      wherein the layer has a second carbon content that is greater than the first carbon content of the substrate.

9. The component of claim 8,
   wherein the nickel-based superalloy of the substrate comprises at least chromium, cobalt, tungsten, aluminum, titanium, and tantalum,
   wherein the nickel-based superalloy of the substrate contains no rhenium and no yttrium,
   wherein the cobalt-based alloy of the layer comprises at least chromium, nickel, and tungsten, and at least one substance selected from the group consisting of: tantalum, aluminum, and titanium.

10. The component of claim 8, wherein the layer at most partially overlaps the metallic coating of the substrate.

11. The component of claim 8, wherein the layer is at least 10% thinner than the metallic coating of the substrate.

12. The component of claim 8, wherein the layer has a thickness of 1 µm to 100 µm.

13. The component of claim 12, wherein the metallic coating comprises NiCoCrAl, NiCoCrAlY, NiCoCrAlTa, NiCoCrAlFe, NiCoCrAlYFe, NiCoCrAlYFeTa, NiCoCrAlFeTa, or NiCoCrAlYTa.

14. The component of claim 8, wherein the metallic coating comprises no carbon.

* * * * *